United States Patent [19]

Franklin

[11] 4,412,279

[45] Oct. 25, 1983

[54] SWITCHING REGULATOR WITH TRANSIENT REDUCTION CIRCUIT

[75] Inventor: Robert C. Franklin, Los Gatos, Calif.

[73] Assignee: Beckman Instruments, Inc., Fullerton, Calif.

[21] Appl. No.: 335,041

[22] Filed: Dec. 28, 1981

[51] Int. Cl.³ .......................................... H02M 7/155
[52] U.S. Cl. .................... 363/128; 323/287; 323/351; 363/44
[58] Field of Search ............... 323/282, 287, 300, 349, 323/350, 351; 363/128, 39, 44

[56] References Cited

U.S. PATENT DOCUMENTS

| | | | |
|---|---|---|---|
| 3,408,551 | 10/1968 | Kuba | 321/10 |
| 3,562,621 | 2/1971 | Schaefer | 320/1 |
| 3,697,820 | 10/1972 | Ehret | 317/418.5 B |
| 3,737,759 | 6/1973 | Pollard | 321/45 C |
| 3,825,814 | 7/1974 | Peily | 321/9 A |
| 3,982,174 | 9/1976 | Maddox | 323/17 |
| 4,074,344 | 2/1978 | Pitel | 363/44 |
| 4,143,414 | 3/1979 | Brewster | 363/44 |
| 4,174,495 | 11/1979 | Rosa | 323/9 |
| 4,191,986 | 3/1980 | ta Huang et al. | 361/58 |
| 4,207,516 | 6/1980 | Babcock | 323/9 |
| 4,245,288 | 1/1981 | McLyman | 323/287 X |
| 4,262,328 | 4/1981 | Bloom | 363/16 |

FOREIGN PATENT DOCUMENTS 811465  3/1981  U.S.S.R. ............................. 363/126

Primary Examiner—William M. Shoop
Attorney, Agent, or Firm—R. J. Steinmeyer; F. L. Mehlhoff; Al A. Canzoneri

[57] ABSTRACT

A switching voltage regulator is provided for coupling a source of AC potential to a DC load. Thyristor full wave rectifier means provide a source of DC potential which is connected to the load through an inductance in series with the load. The input of the inductance is shunted by a commutating diode which provides a path for the inductive current when the thyristor means are in the nonconducting phase of their operating cycle. Circuit means are provided to reverse bias the commutating diode in advance of each conduction cycle of the thyristor means. As a consequence, the level of RFI conducted to the AC power line is significantly reduced.

3 Claims, 6 Drawing Figures

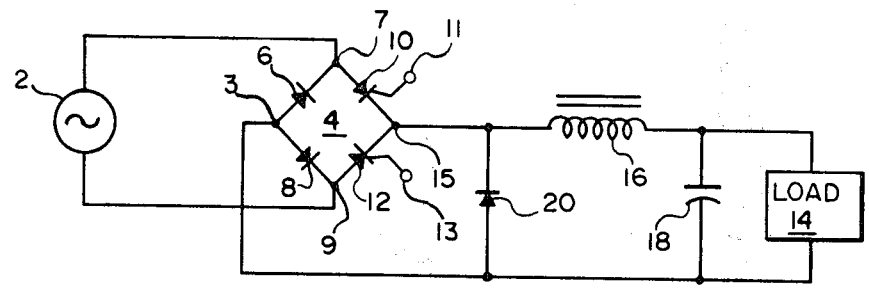
PRIOR ART
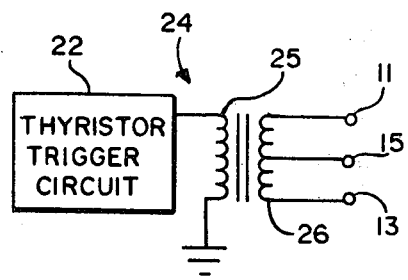
FIG. 1
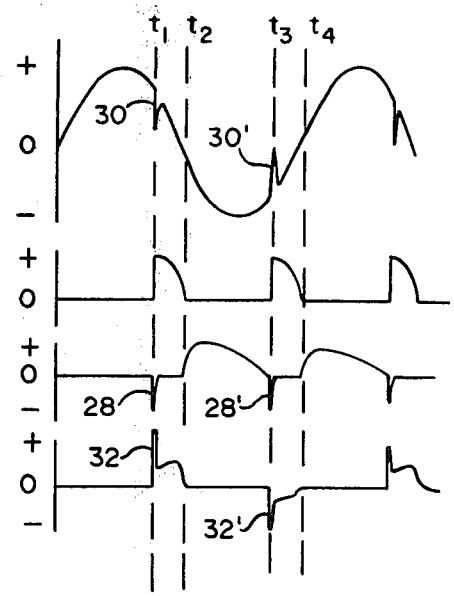
FIG. 2a
FIG. 2b
FIG. 2c
FIG. 2d

4,412,279

SWITCHING REGULATOR WITH TRANSIENT REDUCTION CIRCUIT

BACKGROUND OF THE INVENTION

The present invention relates to switching voltage regulators, and more particularly to a switching voltage regulator in which circuitry is provided to reduce transients generated by reverse current surges in a commutating diode.

Switching-type voltage regulators typically produce higher levels of RFI (radio frequency interference) than dissipative-type regulators. The higher noise level of the switching regulator is a general result of the abrupt transition of the switching function. Each switching cycle of the regulator may produce a large current surge that is often accompanied by a noise transient.

A switching regulator typically employs either thyristor or transistor switching means. Although thyristors are somewhat more efficient than transistors in this application, they are also noisier with regard to RFI. The reason for this is that unlike a transistor, a thyristor cannot conduct at an intermediate level. That is to say, it cannot be turned on gradually; when the thyristor is properly biased and its gate terminal is energized, the thyristor conducts fully. Each conduction cycle of the thyristor may produce current surges which affect the operation of other circuit elements and result in the generation of RFI.

In switching regulators having an inductor in series with a load, it is usual to employ a commutating (or "free wheeling") diode to shunt the input of the inductor. In this way, the diode provides a path for the inductive load current when the regulator's switching means is in the nonconducting phase of its switching cycle. It has been observed that a large RFI transient is developed in the commutating diode each time the switching means become conductive. The transient is the result of a momentary reverse current flowing in the diode.

The reverse current flow in the commutating diode is the result of a well known phenomenon commonly referred to as the "minority carrier sweep out effect." The effect is such that a momentary reverse current flows in a forward biased diode during the interval of its transition from a conducting state to a nonconducting state.

The nature of the reverse current in the diode is that of an extremely short duration, high amplitude "spike." A large radio frequency noise transient resulting from the current spike in the diode is both radiated within the local enclosure and conducted along the AC input line. The RFI conducted by the AC line frequently results in the disruption of other circuits powered by the line.

Numerous solutions have been proposed to alleviate the problem which has been described. These proposals have included the use of commercial RFI line filters and called for additional inductors to be installed at various points in the circuit of the switching regulator. In general, the prior art solutions have proven only moderately successful. In some instances, the size of the inductors required for reducing the line transients have been prohibitively large. It is apparent, therefore, that there is a need for improved circuit means for reducing transients in switching regulators.

SUMMARY OF THE INVENTION

In accordance with the present invention there is provided a switching voltage regulator adapted for coupling a source of AC potential to a DC load. Thyristor full wave rectifier means provide a source of DC potential which is connected to the load through an inductance in series with the load. The input of the inductance is shunted by a commutating diode which provides a path for the inductive current when the thyristor means are in the nonconducting phase of their operating cycle. Circuit means are provided to reverse bias the commutating diode in advance of each conduction cycle of the thyristor means. Accordingly, the level of RFI conduction to the AC power line by the switching voltage regulator of the invention is significantly lower than by switching voltage regulators constructed in the manner of the prior art.

BRIEF DESCRIPTION OF THE DRAWINGS

FIG. 1 is a schematic diagram of a switching regulator constructed in accordance with the prior art.

FIGS. 2a–2d illustrate waveforms associated with the circuit of FIG. 1.

DETAILED DESCRIPTION

Figure 3:
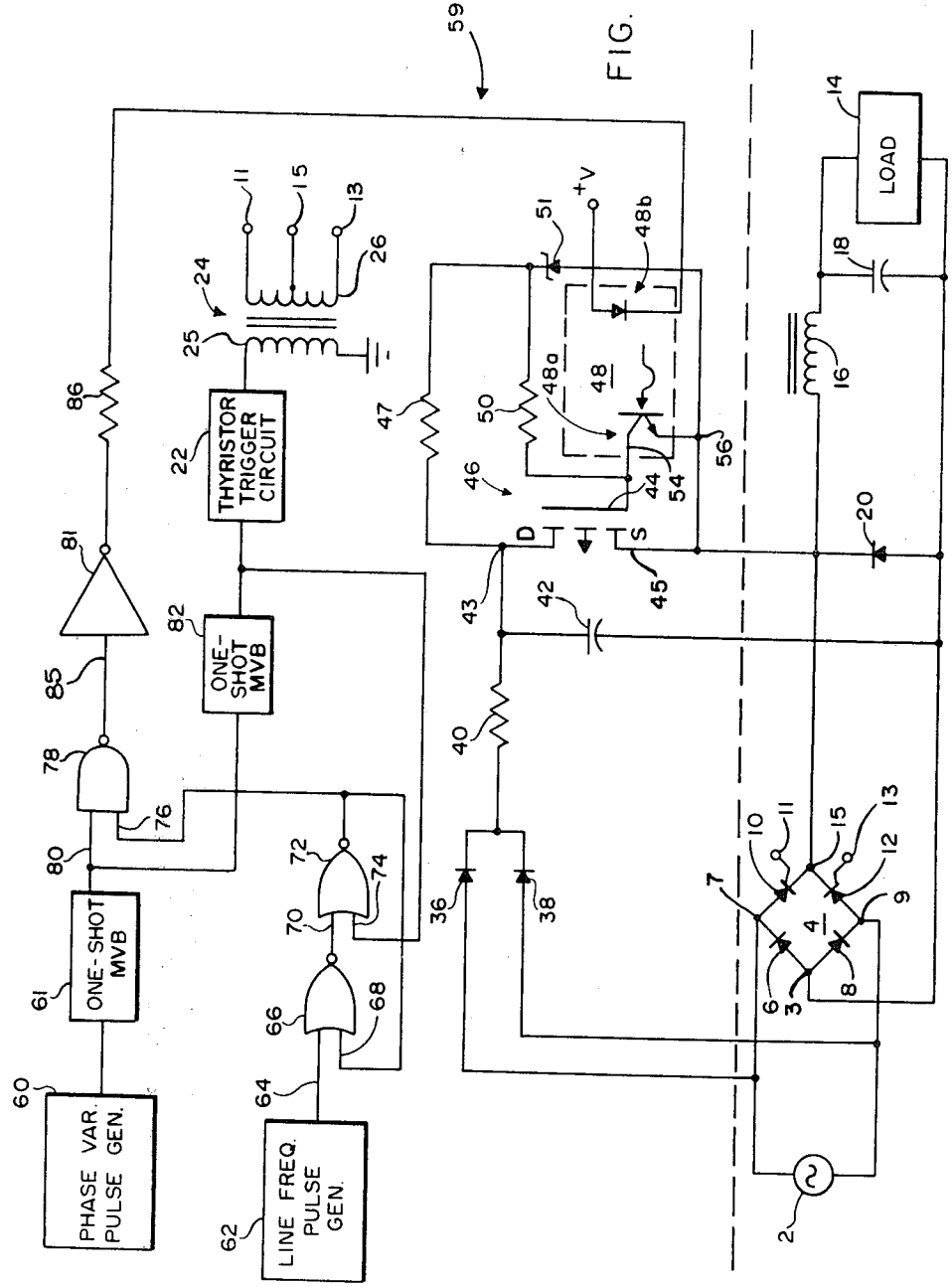
FIG. 3 is a schematic diagram of a switching regulator circuit embodying the invention.

Turning first to FIG. 1, there is shown in schematic form a physical switching voltage regulator circuit. Reference numeral 2 designates a source of AC potential which is connected to the input of a full wave bridge rectifier 4. Rectifier 4 includes two oppositely poled diodes 6 and 8, respectively, and two oppositely poled thyristors 10 and 12, respectively. The AC signal from AC source 2 is rectified by rectifier 4 to provide a DC current to load 14 through inductor 16 in series with the load. A filter capacitor 18 is connected across the load and a commutating diode 20 is connected across the filter comprising inductor 16 and the capacitor 18.

As is common in such rectifier circuits, thyristors 10 and 12 serve as signal gating means to vary the magnitude of the DC current supplied to the load by rectifier 4. The conduction of the thyristors 10 and 12 is controlled by pulses supplied from a thyristor trigger circuit 22. The pulses are conveyed to the gate 11 of thyristor 10 and the gate 13 of thyristor 12 via the transformer 24. Transformer 24 has a primary winding 25 connected to the thyristor trigger circuit 22 and a secondary winding 26 having end terminals 11 and 13 and center tap 15 which are connected by means not shown in the drawing to gate 11 of thyristor 10, gate 13 of thyristor 12 and the positive output terminal 15 of rectifier 4, respectively. The thyristor trigger circuit 22 is powered by the AC source 2 through connections not shown in the drawing. The thyristor trigger circuit 22, operating in synchronism with the alternating current, triggers thyristors 10 and 12 into conduction during a portion of each positive and negative alternation of the alternating current cycle. This conduction extends over a selected angle (conduction angle) in each half of the cycle. The DC current that is delivered to the load, therefore, can be varied in magnitude by varying the conduction angle of thyristors 10 and 12. The conduction angles, in turn, are varied by varying the timing point of the pulses from trigger circuit 22. That is, the pulses are caused to occur at a point representing either a larger or smaller interval in advance of the zero crossing of the AC waveform. Under all circumstances, the conduction angles of thyristors 10 and 12 are made to be identical.

Referring now also to FIGS. 2a-2d, there are depicted waveforms associated with the operation of the prior art switching voltage regulator of FIG. 1. In FIG. 2a there is shown a sinusoidal waveform representing the input voltage to rectifier 4. At time $t_1$ thyristor 10 is triggered into conduction by trigger circuit 22. This produces a voltage across the commutating diode 20 which is depicted by the waveform of FIG. 2b. Although the voltage at the cathode of diode 20 is positive with respect to the anode, the initial response of the diode before becoming reverse biased is to conduct momentarily, in the reverse direction. This action is a result of the earlier discussed "minority carrier sweep-out effect."

Reverse conduction by diode 20, in effect, short circuits the output of rectifier 4 and produces a high amplitude, extremely short duration reverse current spike in diode 20. The waveform of the current flowing in diode 20 is seen in FIG. 2c, wherein the reverse current spike is identified by reference numeral 28. The current spike 28 produces an RFI transient which is both radiated within the immediate circuit enclosure, and also propagated along the AC line, causing disturbances in other circuits. The transient is illustrated by voltage spike 30 in FIG. 2a which shows the waveform of the AC voltage at input terminals 7 and 9 of rectifier 4. FIG. 2d shows the waveform of the current which flows between AC source 2 and terminal 7 of rectifier 4. It will be seen that at time $t_1$ there is a sharp spike 32 representing the alternating current component of the transient.

At time $t_2$, thyristor 10 stops conducting, and, as shown in the waveform of FIG. 2c, diode 20 becomes forward biased and conducts the inductive current supplied by inductor 16. At time $t_3$, thyristor 12 is triggered into conduction, and the process described at time $t_1$ is repeated.

It will be seen, therefore, that the momentary reverse current in the commutating diode 20 is in effect like a very low impedance shunting the AC line. Also, in view of the high amplitude and extremely short duration of this current flow, its waveform is that of a high frequency component. Now, although the impedance of the typical AC input line is very low at line frequency (e.g. 60 Hertz), there is sufficient inductance in the wiring to develop a significant amount of reactance at high frequency, such as represented by the short duration current spike in the commutating diode. As a result, a large voltage is dropped across this reactance as was shown by voltage spike 30 of FIG. 2a.

Referring now to FIG. 3, there is shown the switching regulator of FIG. 1 with added circuitry 59 for reducing the level of RFI transients produced by such regulators. In general, the circuitry of the invention accomplishes this by "sweeping" the forward charge from the commutating diode 20 just prior to triggering either thyristor 10 or 12. Thus, any transients developed in the commutating diode 20 cannot be conducted to the AC line, since both thyristors are at this point in time still in a nonconducting state. Moreover, when it is time for one of the thyristors 10 or 12 to conduct, the commutating diode 20 is already in a reverse biased (nonconducting) state, and so, does not react significantly to the thyristor switched current which developed RFI in the prior art switching voltage regulator such as depicted in FIG. 1.

In the voltage regulator of the invention, an additional rectifier means 36 and 38 is provided to maintain a charge in an added capacitor 42, which is connected through a switching transistor 46 to the commutating diode 20. During each half of the operating cycle, a timing circuit 59 triggers the switching transistor 46, 50 microseconds in advance of triggering the thyristor. This enables the added capacitor 42 to discharge a portion of its charge through the switching transistor to the commutating diode 20, and by so doing, neutralize the forward bias on the diode. Thus, when one of the thyristors conducts, the diode will already be in a nonconducting state.

The added circuitry 59 will now be described with reference to FIG. 3, wherein it is shown that transistor 46 has its source terminal 45 connected to the cathode of commutating diode 20, and its gate 44 is controlled by optical coupler 48. Optical coupler 48 is an isolating device comprising a photo-transistor 48a activated by an LED (light emitting diode) 48b. A source of positive voltage, not shown, supplies the operating voltage to power the various circuit devices of circuitry 59. Included among these devices is optical coupler 48 in which the driving voltage to LED 48b is supplied from such voltage source through the input terminal labeled "+V."

A charged capacitor 42 is connected to the drain terminal 43 of transistor 46 so that when the transistor conducts, the charge in capacitor 42 is conveyed to the commutating diode 20. A pair of rectifier diodes 36 and 38 have their anodes connected one to each terminal, respectively, of AC power source 2, to provide a source of positive DC voltage. This positive voltage maintains a charge on capacitor 42 through resistor 40 and supplies the gate capacitor to transistor 46 via the voltage regulator comprises of resistor 47 and Zener diode 51, and through the series resistor 50. It will be seen that the collector 54 and emitter 56 of the transistor section of optical coupler 48 are connected to the gate 44 and source 45, respectively, of the transistor 46. Thus, when the LED section of the optical coupler is energized (which is the normal state), the transistor section of the coupler conducts to fix the bias on the gate of transistor 46 at zero volts, thereby holding the transistor in a nonconducting state.

The circuitry 59 controlling the operation of the switching voltage regulator includes a phase variable pulse generator 60 which delivers pulses to one-shot multivibrator 61. The phase variable pulse generator 60 is an AC line synchronized circuit of a type well known in the art and commonly used for triggering thyristors. One example of such a circuit is shown in FIG. 13.40 of G.E. TRANSISTOR MANUAL, 1964, 7TH EDITION. While the output from the phase variable pulse generator 60 is for convenience, referred to herein as a "triangular" pulse, it will be understood that the requirements of the circuit are noncritical as to the form, amplitude or duration of the pulse. The latter, for example, has been found suitable in the range of from 1 to 5 microseconds duration. The pulse timing or phase, however, determines the conduction angles of thyristors 10 and 12, which, in turn, determine the output voltage of the regulator. The phase variable pulse generator 60, therefore, is set according to the output voltage level desired. The triangular pulse output of phase variable pulse generator 60 is fed to one-shot multivibrator 61 which converts the triangular pulse to a 50 microsecond pulse waveform. One-shot multivibrator 61 converts the input pulse to a 50 microsecond pulse waveform.

Also included in circuitry 59 is line frequency pulse generator 62, which provides a square wave pulse at each zero-crossing of the AC line voltage, and which is connected to a bistable circuit comprised of NOR gate 66 and 72. A square wave pulse is emitted by line frequency pulse generator 62 upon each zero crossing of the AC line voltage. This square wave pulse is fed to terminal 64 of NOR gate 66, which causes the output of gate 66 to go low. This low output signal appears at input terminal 70 of NOR gate 72, setting the output of gate 72 high. The high output of NOR gate 72 is fed back to input terminal 68 of NOR gate 66, thereby latching NOR gate 66 in a low output state. The high output signal of NOR gate 72 is also fed to input terminal 76 of NAND gate 78. With the output from the one-shot multivibrator 61 (a 50 microsecond pulse) appearing at the other input terminal 80, the output of NAND gate 78 is set low. The low state output of NAND gate 78 is fed to terminal 85 of inverting driver 81 which provides the level of current necessary, through resistor 86, to drive the LED section 48b of optical coupler 48. The low-state signal received from NAND gate 78 causes the output of the inverting driver 81 to go high, which removes the drive to the LED section of optical coupler 48 and causes the transistor section 48a to cease conduction. The bias is therefore restored on the gate of transistor 46, enabling it to conduct and thereby discharge a portion of the charge in capacitor 42 across the commutating diode 20. The positive charge which appears at the cathode of commutating diode 20 reverse biases it, which curtails the flow of forward current in the diode from inductor 16.

The 50 microsecond pulse output of one-shot multivibrator 61 is also fed to one-shot multivibrator 82 which outputs a 10 microsecond wide square wave pulse which is displaced in time from its input by 50 microseconds. In other words, the trailing edge of the 50 microsecond input pulse is coincident in time with the leading edge of the 10 microsecond output pulse of one-shot multivibrator 82. The output from one-shot multivibrator 82 is fed into the thyristor trigger circuit 22, to produce a triggering pulse to trigger one of the alternately conducting thyristors 10 and 12.

The thyristor trigger circuit 22 is connected to the primary winding 25 of transformer 24. The secondary winding 26 of transformer 24 had output terminals 11 and 13 which are connected to the gate terminals of thyristors 10 and 12, respectively. In addition, the center tap 15 of secondary winding 26 is connected to output terminal 15 of rectifier 4. It will be recalled that the thyristor 10 and 12 are triggered alternately during opposing halves of the operating cycle. Accordingly, each thyristor is triggered into conduction 50 microseconds after commutating diode 20 has been reverse biased thereby precluding any significant interaction between the diode and the current conducted by the thyristor.

Note will also be taken of the connection between the output of one-shot multiplier 82 and input terminal 74 of NOR gate 72. This feedback signal (a 10 microsecond square wave pulse) serves to reset the bistable circuit comprised of NOR gates 66 and 72 so that their output, which appears at input terminal 76 of NAND gate 78, is low. This inhibits NAND gate 78 from conducting any additional pulses until the following AC half-cycle, with the result that capacitor 42 will be discharged only once during each half cycle.

For the purpose of illustration, but in no way to be considered as limiting the invention, below are listed the following component values which are appropriate to a particular embodiment:

| Diodes | |
|---|---|
| 6, 8, and 20 | 25 amp, 400 volts |
| 36, 38 | 1N4001 |
| Thyristors | |
| 10 and 12 | 25 amp, 400 volts |
| Transistor | |
| 46 | VMOS FET |
| Optical Coupler | |
| 48 | General Electric Type H11A1 or equiv. |
| Resistors | |
| 40 | 1K ohms |
| 47 | 10K ohms |
| 50 | 1.5K ohms |
| 86 | 470 ohms |
| Capacitors | |
| 18 | 6000 MFD |
| 42 | 10 MFD |
| Inductor | |
| 16 | .02 Henry |

While in accordance with the patent statutes there has been described what at present is considered to be a preferred embodiment of the invention, it will be understood by those skilled in the art that various changes and modifications may be made therein without departing from the invention and it is, therefore, the aim of the appended claims to cover all such changes and modifications as fall within the true spirit and scope of the invention.

What is claimed is:

1. In a switching voltage regulator including an AC voltage source, a full wave rectifier having its input terminals connected to the voltage source, a positive output terminal and negative output terminal connected to a load, and having a thyristor in each of two legs connected to the positive output terminal, an L-C filter including an inductor in series with the load and a first capacitor connected across the load, a commutating diode connected between the output terminals of the rectifier and across the L-C filter, and circuit means for activating the thyristors alternately over a predetermined period, the improvement comprising:
   means synchronized to the circuit means for reverse biasing the commutating diode in advance of each activation of the thyristors.

2. The switching voltage regulator of claim 1 wherein said means synchronized to the circuit means for reverse biasing the commutating diode in advance of each activation of the thyristors comprise:
   a second capacitor;
   means for charging the second capacitor;
   switching means synchronized with said circuit means for periodically closing to at least partially discharge the second capacitor through the commutating diode.

3. The switching voltage regulator of claim 2 wherein said switching means synchronized with said circuit means for at least partially discharging the second capacitor through the commutating diode comprise:
   a transistor;
   means for connecting the transistor to said circuit means;
   means for providing a source of signals to switch the transistor; and
   optical coupling means for coupling the transistor to the source of signals.

* * * * *